Figure 7:
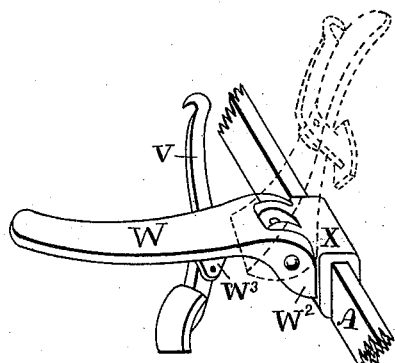

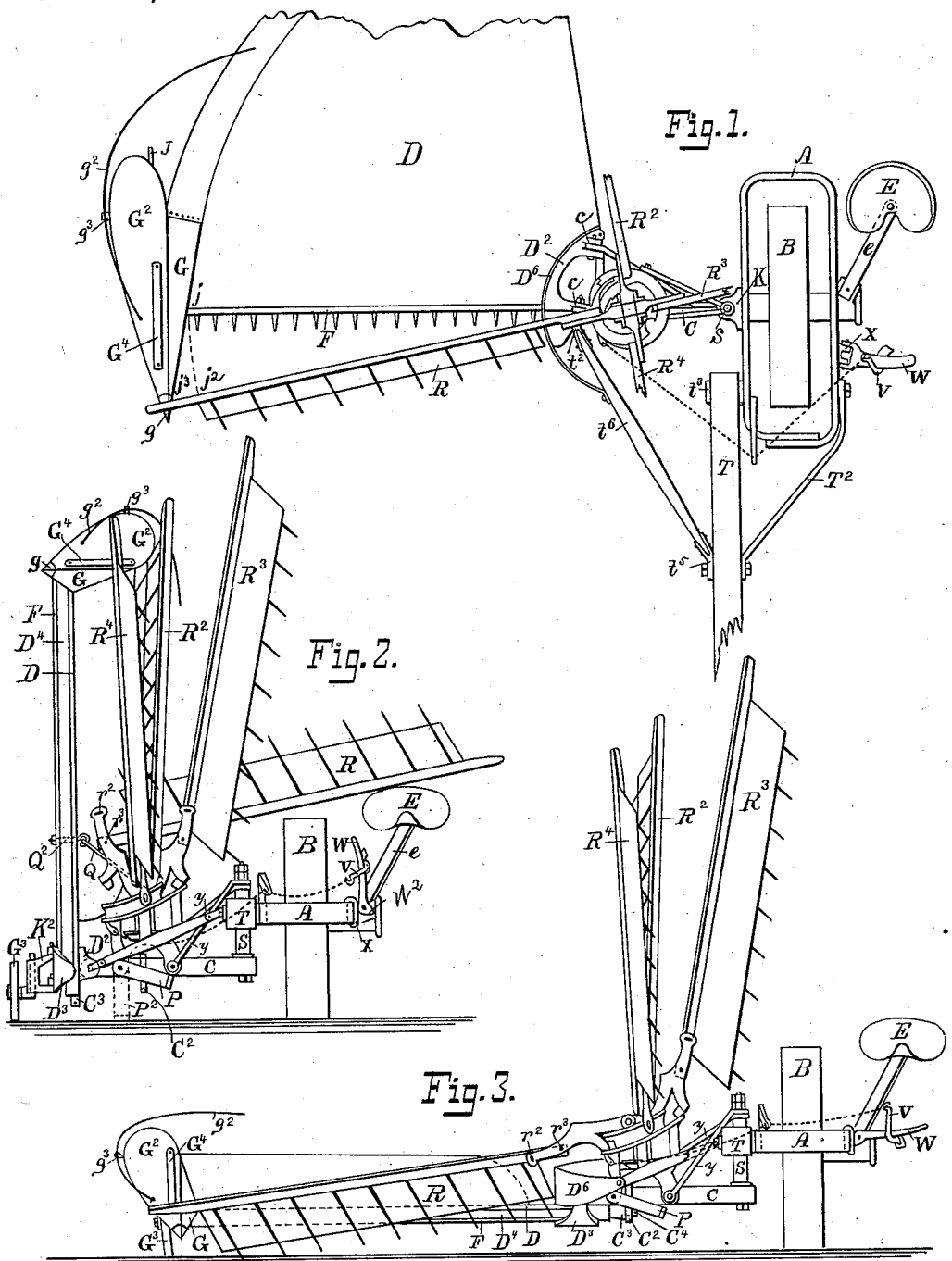

(No Model.) 3 Sheets—Sheet 2.

W. N. WHITELEY.
HARVESTING MACHINE.

No. 365,324. Patented June 21, 1887.

Witnesses:
Oscar E. Perrigo
F. B. Furniss

Inventor:
William N. Whitely

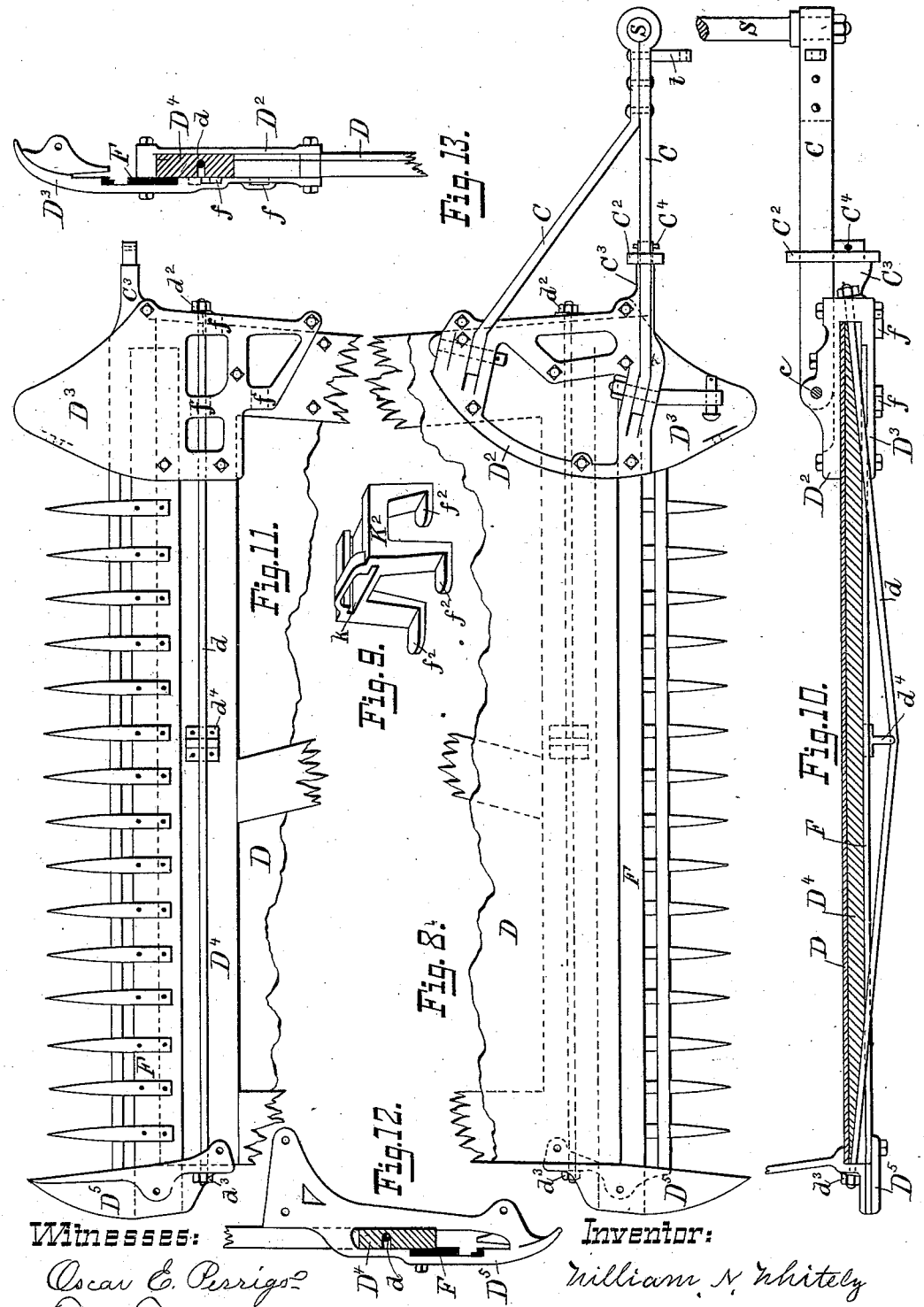

UNITED STATES PATENT OFFICE.

WILLIAM N. WHITELEY, OF SPRINGFIELD, OHIO.

HARVESTING-MACHINE.

SPECIFICATION forming part of Letters Patent No. 365,324, dated June 21, 1887.

Application filed November 23, 1885. Serial No. 183,684. (No model.)

*To all whom it may concern:*

Be it known that I, WILLIAM N. WHITELEY, a citizen of the United States, residing in the city of Springfield, in the county of Clark and State of Ohio, have invented certain new and useful Improvements in Harvesting-Machines; and I hereby declare the following to be a full, clear, and exact description of the same, reference being had to the accompanying drawings, forming a part of this specification.

This invention constitutes a part of the improvements upon the harvester described in my Letters Patent No. 351,891, granted November 2, 1886, and from which I have elected to detach certain features of my invention, making a separate application for Letters Patent thereon; and I therefore hereby disclaim as to this patent the invention therein claimed, to wit, the main frame and the main driving-wheel, which is fixedly journaled thereon, and having the gearing which drives the knife and the rake properly attached thereto, and a supplemental frame supporting the raking and reeling mechanism, and having a vertical adjustment independent of the main frame, and forming the connection between it and the platform and cutting apparatus, and a platform jointed to the supplemental frame in such a manner that it may be folded for transportation or quickly returned to its horizontal position and made as rigid as though it were not constructed with a joint.

My invention relates to that class of harvesters known as "self-raking reapers and mowers," in which the platform and cutting apparatus may be folded up to a vertical position for convenient transportation.

The object of my invention is, primarily, to construct a self-raking reaper having the cutting apparatus, (i. e., the finger-bar, platform, &c.,) capable of being easily folded up to a vertical position for transportation or for passing through confined passages—as gateways, &c.—securely retained in that position or quickly returned to its horizontal position and made as rigid as though it were not constructed with a joint, and specially as relates to the particular points claimed in this specification. The divider-wheel may be removed to serve as a carrying-wheel when the platform is folded for transportation. The controller and trip-lever is constructed with a hinge to enable it to be folded up out of the way, and the platform has peculiarly constructed and arranged shoes, truss-rod, and other novel devices for combining great strength and rigidity with light weight.

That others may more fully understand my improvements, I will more particularly describe them, referring to the drawings hereunto annexed, and forming a part of this specification, and which show all the features of a harvester needed to fully illustrate my improvements and their application.

Figure 4:
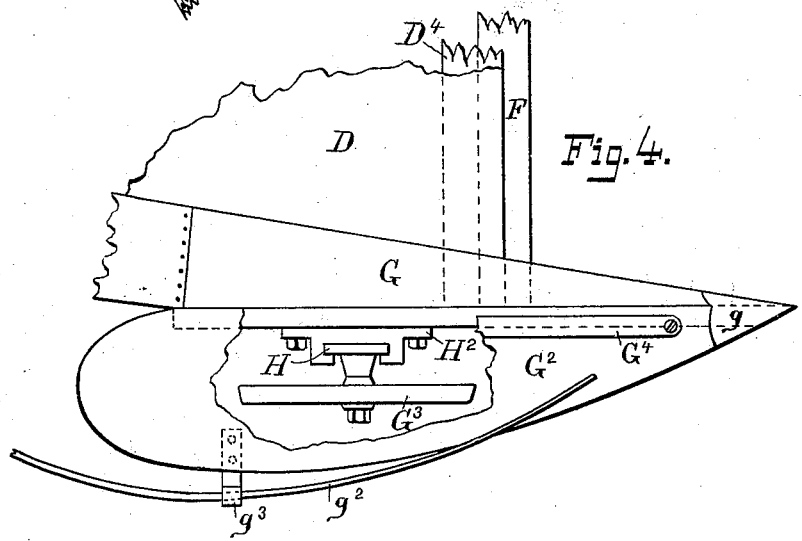
Figures 5, 6:
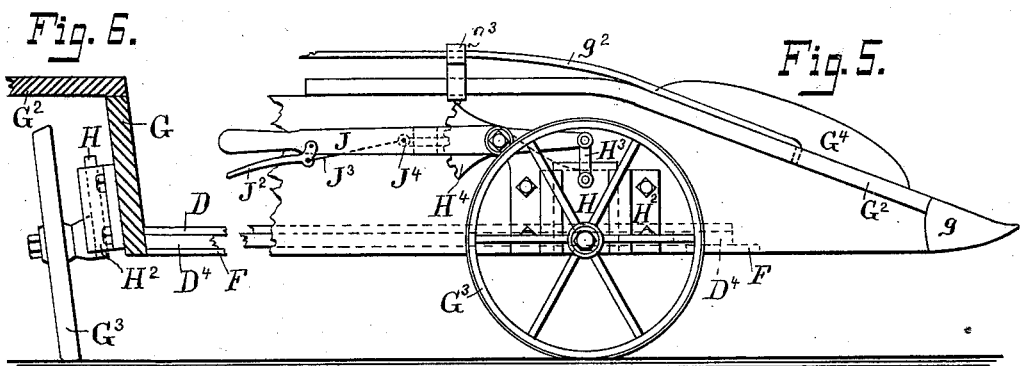

Figure 1 is a plan of my machine. Fig. 2 is a front elevation showing the platform folded for transportation. Fig. 3 is a front elevation showing the platform in position for cutting. Fig. 4 is plan of the divider. Fig. 5 is an end elevation, and Fig. 6 a cross-section of the same. Fig. 7 is a perspective view of the controller and trip-lever. Fig. 8 is a plan (top view) of the finger-bar and a portion of the platform with their connection with the main frame by means of the supplemental frame, &c. Fig. 10 is a longitudinal section, and Fig. 11 is a bottom view of the same. Fig. 9 is a perspective view of the three-legged bracket used to support the divider-wheel when it is used as a carrying-wheel, when the machine is folded for transportation. Fig. 12 is a cross-section through the outer shoe, and Fig. 13 a cross-section through the inner shoe.

In these views some of the parts, not necessary to illustrate the features for the explanation of which the views have been made, are omitted to avoid confusion.

Similar letters refer to like parts in the several views.

The main frame A is constructed of a single flat bar of wrought-iron or steel, preferably the latter, bent into a rectangular form, as shown, with the ends lapped and riveted together.

To the main frame A is secured the boxes in which is journaled the shaft of the main driving-wheel B. Upon the outer box is formed a bracket, to which is secured the seat-spring $e$, supporting the driver's seat E.

The gearing for driving the rake and knife is of the usual construction used in my machine, and described and shown in my Letters Patent No. 351,891.

Upon the inner side of the main frame A is bolted the bracket K, having cast upon it two vertically-perforated lugs, through which slides the vertical rod S, to the bottom of which is fixed the Y-shaped bar C C, which is suspended and braced by the brace rods y y. The Y-shaped bar C C, vertical rod S, and braces y y form the supplemental frame by which the platform is attached to the main frame, but having a vertical adjustment independent to said frame, and being adjusted and held in position by the usual lifting-lever, (not shown,) whose lifting-rod is pivoted to the stud t in the supplemental frame, as shown and described in my Letters Patent No. 351,891.

Upon the top of the platform D is the hinge-plate $D^2$, bolted through the platform to the inner shoe, $D^3$, placed underneath. In the hinge-plate $D^2$ is formed suitable receptacles, in which the Y-shaped bar C C is pivoted, as shown. Upon the hinge-plate $D^2$ is formed the projecting lug $C^3$, which projects from the pivot c c, under the front portion of the Y-shaped bar C, to which it is clamped by the rectangular sliding keeper or loop $C^2$, which is held in place by the pin $C^4$, by which means the flexible joint c c is rendered rigid when the machine is in position for cutting grain, and at the same time very easily freed when it is desired to fold the platform for transportation. The draft-tongue T is pivoted to the inside of the main frame at $t^3$, and braced by the brace $T^2$, which is pivoted to the outside of the main frame in a direct line with the pivot $t^3$, and also by the brace $t^6$, pivoted to the tongue and pivot-bolt $t^2$, by which the front portion of the Y-shaped bar C C is pivoted to the hinge-plate $D^2$. The relative angle of the tongue T and main frame A is changed at will or maintained at any desired point by the usual tilting-lever, rock-shaft and arm pivoted in brackets fixed to the main frame, and link pivoted to the arm and to the tongue, as described in my Letters Patent No. 351,891.

Bolted to the outside of the main frame, within easy reach of the driver, is the bracket X, to which is pivoted the foot-rest W, which has formed upon it the projection $W^2$, which rests against the bracket X, preventing the foot-rest W from dropping lower than a horizontal line, but at the same time allowing it to be folded back past a vertical position, as shown by dotted line in Fig. 7, for the purpose of getting it out of the way to avoid the danger of being broken in driving the machine through gateways and other confined passages.

Pivoted to a lug formed on the under side of the foot-rest W is a trip-lever, V, having a convenient foot-piece formed upon its lower end, and the upper end projecting vertically and terminating in a hook, to which the usual trip-chain is attached, as shown. The chain, trip, rake-cam, &c., are of the usual construction, and therefore need no further explanation than to say that the cam has three legs projecting downward, by which it is bolted to the Y-shaped bar C C of the supplemental frame.

The construction and arrangement of the platform and its connections are peculiar, and are as follows: To the under side of the front sill, $D^4$, of the platform D is bolted the finger-bar F, which is also bolted to the inner shoe, $D^3$, and outer shoe, $D^5$. The inner shoe, $D^3$, extends a considerable space under the inner corner of the platform D, and upon the top directly over it, and covering a like space, is the hinge-plate $D^2$, which has a downwardly-projecting ledge covering the inner edge of the platform, while upon its top is formed proper recesses for the reception of the ends of the Y-shaped bars C C of the supplemental frame, and in which it is pivoted. The hinge-plate $D^2$ and inner shoe, $D^3$, are firmly secured by several bolts passing through both and also through the platform. The outer shoe is formed with a longitudinal groove of sufficient width to admit the end of the front sill, $D^4$, of the platform, to which it is firmly bolted. The truss-rod d extends the entire length of the platform, passing under the downwardly-projecting bracket $d^4$, the ends lying in grooves in the bottom of the front sill, $D^4$, and passing out through the hinge-plate $D^2$ at the inner end and through the outer shoe, $D^5$, at the outer end, the ends of the rod being secured by the tension-nuts $d^2$ and $d^3$, respectively, at the inner and outer ends of the platform. By this construction the platform is clamped both in a vertical and horizontal direction, and the usual strain borne by the finger-bar and wooden sill is in a great measure taken by the inner and outer shoe, the hinge-plate, and the truss-rod, all of which are secured by nuts which can be tightened to any necessary extent and the whole made very rigid without the addition of any unnecessary weight. The hinge-plate $D^2$ is also utilized as a support for the sheet-iron guard $D^6$, Figs. 1 and 2, attached thereto in a semicircular form, for the purpose of preventing the grain from falling over upon the joint c c and adjacent parts. The divider has the top board, $G^2$, lying horizontal (or nearly so) with a plane parallel to the finger-bar, instead of an inclined position, its principal inclinations being from a point directly over the divider-wheel $G^3$ downward to the point g, Fig. 5, while about one-third of the length of the top board, $G^2$, from the rear is level, or nearly so. The rake-guide $G^4$ is attached to the top board, $G^2$, at right angles with the finger-bar F. The rakes are constructed with the head projecting outwardly a sufficient length beyond the teeth to rest upon the rake-guide $G^4$, whose inclination is just sufficient to support the rake in such a position that the points of the teeth shall clear the cutter-bar. The divider-wheel $G^3$ is journaled upon the sliding plate H, which slides vertically in the bracket $H^2$, bolted to the divider G.

Pivoted to the bracket $H^2$ is the adjusting-lever J, which is connected to the sliding plate H by the link H³. The lever J is provided with the usual hand-piece, J², from which the rod J³ connects with the catch-pin J⁴, engaging in the notches in the segment H⁴, and holds the divider-wheel at any point to which the outer end of the platform may be raised or lowered by the adjusting-lever J. The fender rod $g^2$ has one end fixed in the top board, G², of the divider, and is supported by the bracket $g^3$, attached to the under side of the top board, G². The rear end of the fender-rod $g^2$ is curved inwardly, lying somewhat above the backboard of the platform D, by which form it is made useful in preventing tangled grain from falling over the backboard.

When it is desired to fold up the platform for the purpose of rendering the machine more compact and portable in passing through gateways or going upon the road, it is accomplished as follows: The rake R, Fig. 3, is folded back to the position shown at R, Fig. 2, by removing the bolt $r^2$ and turning the rake back on the bolt $r^3$ as a pivot. The sheet-iron guard D⁶ is then removed by taking out the bolts which secure it to the hinge-plate D². The pivoted leg P is turned down to the position shown by dotted lines at P², and, resting upon the ground, furnishes a support for the inner end of the platform. The pin C⁴ is then withdrawn, and the keeper C² is moved along on the bar C until the lug C³ is disengaged, after which the link H³ is disconnected from the sliding plate H, and the divider-wheel G³ and sliding plate H withdrawn from the bracket H². The platform is now folded up to a vertical position and secured there by the brace Q, running from the top of the rake-cam column, where it is secured by a nut to the platform D, where it is secured by an eye-bolt, Q², which passes through the platform and is held by a nut, as shown. Upon the bottom of the inner shoe are formed three slots, $fff$, Figs. 10, 11, and 13, into which are fitted corresponding projections, $f^2, f^2, f^2$, formed upon the three-legged bracket K². (Shown in perspective at Fig. 9.) This bracket being slipped into its place, the divider-wheel G³ is attached by sliding the plate H up into the groove $k$ in the three-legged bracket K². The pivoted leg P is now folded up to the position shown at P and the weight of the platform thrown upon the divider-wheel G³, which has now become a carrying-wheel, and the machine is perfectly balanced upon the main wheel B and the divider-wheel G³.

Having thus fully described my invention, what I claim as new, and desire to secure by Letters Patent, is—

1. The platform D, having fixed thereto the hinge-plate D², in which is pivoted the Y-shaped bar C C of the supplemental frame, and upon which is formed the lug C³, in combination with said Y-shaped bar C C, pivoted to said hinge-plate D², and having a rectangular sliding keeper or loop, C², sliding upon one branch thereof and embracing the lug C³, all constructed and arranged substantially in the manner described, and for the purposes set forth.

2. The combination of the platform D, having the inner shoe, D³, fixed beneath, and the hinge-plate D² upon the top of the inner corner and projecting over the edge thereof, the whole being firmly bolted together by vertical bolts passing through the said hinge-plate D², platform D, and the inner shoe, D³, and the outer shoe, D⁵, having formed in it a longitudinal groove or recess into which the outer end of the front sill, D⁴, on the platform D is fitted, and to which it is firmly secured by vertical bolts, with a truss-rod, $d$, placed beneath the platform D, the center passing under the bracket $d^4$, fixed to the under side of the platform D, the ends lying in grooves in the under side of the front sill, D⁴, of the platform D, and passing out through the outer shoe, D⁵, at one end and the hinge-plate D² at the other, and secured by the tension-nuts $d^2$ and $d^3$, all constructed and arranged substantially as described, and for the purposes set forth.

3. The divider-wheel G³, journaled on the sliding plate H, the sliding plate H sliding in a groove in the bracket H², the bracket H² fixed to the divider G, in combination with the inner shoe, D³, fixed to the platform D and having formed in it the slots or recesses $fff$, and the three-legged bracket K², having formed upon it three projections or lugs, $f^2 f^2 f^2$, fitted to the slots or recesses $fff$, and a groove in which slides the sliding plate H, substantially in the manner described, and for the purpose of utilizing the divider-wheel as a carrying-wheel when the platform is folded for transportation.

4. The bracket X, fixed to the main frame A, and having the foot-rest pivoted to it, the foot-rest W, pivoted to the bracket X, and having one or more projections, W², formed thereon to prevent the foot-rest from falling below a horizontal line, and also having formed upon its under side a perforated projection, W³, to which the trip-lever is pivoted, in combination with the trip-lever V, pivoted to the foot-rest W, and having formed upon its lower end a convenient foot-piece and upon its upper end a hook or its equivalent for attaching the trip-chain, all constructed and arranged in the manner shown and described, and for the purpose set forth.

WILLIAM N. WHITELEY.

Witnesses:
F. B. FURNISS,
SOL J. HOUCK.